(12) United States Patent
vanderZweep et al.

(10) Patent No.: US 9,721,356 B2
(45) Date of Patent: Aug. 1, 2017

(54) METHODS AND SYSTEMS FOR PROGRAMATICALLY IDENTIFYING SHAPES IN GRAPHICAL ARTIFACTS

(71) Applicant: HONEYWELL INTERNATIONAL INC., Morristown, NJ (US)

(72) Inventors: Jeff vanderZweep, Peoria, AZ (US); Tim Felke, Damascus, MD (US); David Mikulka, Zlinsky kraj (CZ); Charles Zhao, Beijing (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/828,731

(22) Filed: Aug. 18, 2015

(65) Prior Publication Data

US 2017/0053420 A1 Feb. 23, 2017

(51) Int. Cl.
*G06K 9/52* (2006.01)
*G06T 7/60* (2017.01)
*G06K 9/62* (2006.01)

(52) U.S. Cl.
CPC .............. *G06T 7/60* (2013.01); *G06K 9/6217* (2013.01); *G06K 9/6255* (2013.01); *G06T 2207/30242* (2013.01)

(58) Field of Classification Search
CPC ............ G06T 7/60; G06T 2207/30242; G06K 9/6255; G06K 9/6217
USPC ....... 382/103, 155, 203, 201, 206, 115, 131, 382/165; 715/762, 706, 760, 853; 345/426, 667, 156, 173, 690, 213, 582, 345/619, 158; 709/204.205, 202, 206; 706/52, 46; 705/40
See application file for complete search history.

(56) References Cited

U.S. PATENT DOCUMENTS

| 6,801,661 | B1 | 10/2004 | Sotak et al. |
| 7,095,418 | B2 * | 8/2006 | Levene .................. G06T 15/04 345/441 |
| 7,583,272 | B2 | 9/2009 | Ramani et al. |
| 7,629,981 | B1 * | 12/2009 | West ...................... G06T 11/00 345/589 |
| 7,912,907 | B1 * | 3/2011 | Mantel .................. H04L 12/585 706/52 |
| 8,031,948 | B2 | 10/2011 | Liu et al. |
| 8,145,545 | B2 | 3/2012 | Rathod et al. |
| 8,345,042 | B2 | 1/2013 | Kataoka et al. |

(Continued)

OTHER PUBLICATIONS

Gelfand, N. et al.; Shape Segmentation Using Local Slippage Analysis; Eurographics Symposium on Geometry Processing (2004).

(Continued)

*Primary Examiner* — Sheela C Chawan
(74) *Attorney, Agent, or Firm* — Lorenz & Kopf, LLP

(57) ABSTRACT

Methods and systems are provided for processing a graphical artifact. In one embodiment, a method includes: receiving, by a processor, a graphical artifact having at least one unknown graphical element; determining, by the processor, graphical features of the unknown graphical element; computing, by the processor, a plurality of similarity scores based on the features of the unknown graphical element and features of a plurality of known graphical elements; and storing data associated with the unknown graphical element with data associated with a known graphical element based on the plurality of similarity scores.

11 Claims, 3 Drawing Sheets

(56) References Cited

U.S. PATENT DOCUMENTS

| | | |
|---|---|---|
| 8,380,644 B2 | 2/2013 | Zouhar et al. |
| 8,422,763 B2 | 4/2013 | Gutierrez |
| 8,744,196 B2 * | 6/2014 | Sharma ............... G06K 9/4604 |
| | | 382/224 |
| 8,805,813 B2 | 8/2014 | Branca et al. |
| 9,002,062 B2 | 4/2015 | Aller |
| 2005/0002571 A1 | 1/2005 | Hiraga et al. |
| 2007/0063707 A1 * | 3/2007 | Van Berkel ............ G06F 3/044 |
| | | 324/457 |
| 2013/0080443 A1 | 3/2013 | Regli et al. |
| 2013/0311450 A1 | 11/2013 | Ramani et al. |

OTHER PUBLICATIONS

Wang, J. et al.; Shape matching and classification using height functions; Pattern Recognition Letters 33 (2012) 134-143.

Veltkamp, R.C. et al.; Shape matching: Similarity Measures and Algorithms; Dept. Computing Science, Utrecht University, The Netherlands, May 2001.

Krish, K et al.; A Shape Recognition Algorithm Robust to Occlusion: Analysis and Performance Comparison; Sep. 13, 2007.

* cited by examiner

METHODS AND SYSTEMS FOR PROGRAMATICALLY IDENTIFYING SHAPES IN GRAPHICAL ARTIFACTS

TECHNICAL FIELD

The present disclosure generally relates to methods and systems for evaluating graphical artifacts, and more particularly relates to methods and systems for identifying shapes in graphical artifacts.

BACKGROUND

Various types of graphical artifacts are used to describe or define the structure and/or behavior of a system. For example, graphical artifacts such as, schematics, topology diagrams, etc. may be used to define a system. In some instances, these graphical artifacts may be used to create diagnostic models for troubleshooting the system. For example, a diagnostic model can be auto-generated from certain graphical artifacts. In order to auto-generate the diagnostic model, the auto-generation tool must know the shapes used in the graphical artifact and their associated function. Given the number of different types of graphical artifacts that may be used to define a system, many variations exist in the shapes and associated functions. Each variation must be manually defined in the auto-generation tool which can be time consuming and costly. In addition, as new graphical artifacts become in use, the auto-generation tool must be updated.

Hence, there is a need for improved systems and methods for processing shapes of graphical artifacts. Other desirable features and characteristics will become apparent from the subsequent detailed description and the appended claims, taken in conjunction with the accompanying drawings and the foregoing technical field and background.

BRIEF SUMMARY

Methods and systems are provided for processing a graphical artifact. In one embodiment, a method includes: receiving, by a processor, a graphical artifact having at least one unknown graphical element; determining, by the processor, graphical features of the unknown graphical element; computing, by the processor, a plurality of similarity scores based on the features of the unknown graphical element and features of a plurality of known graphical elements; and storing data associated with the unknown graphical element with data associated with a known graphical element based on the plurality of similarity scores.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
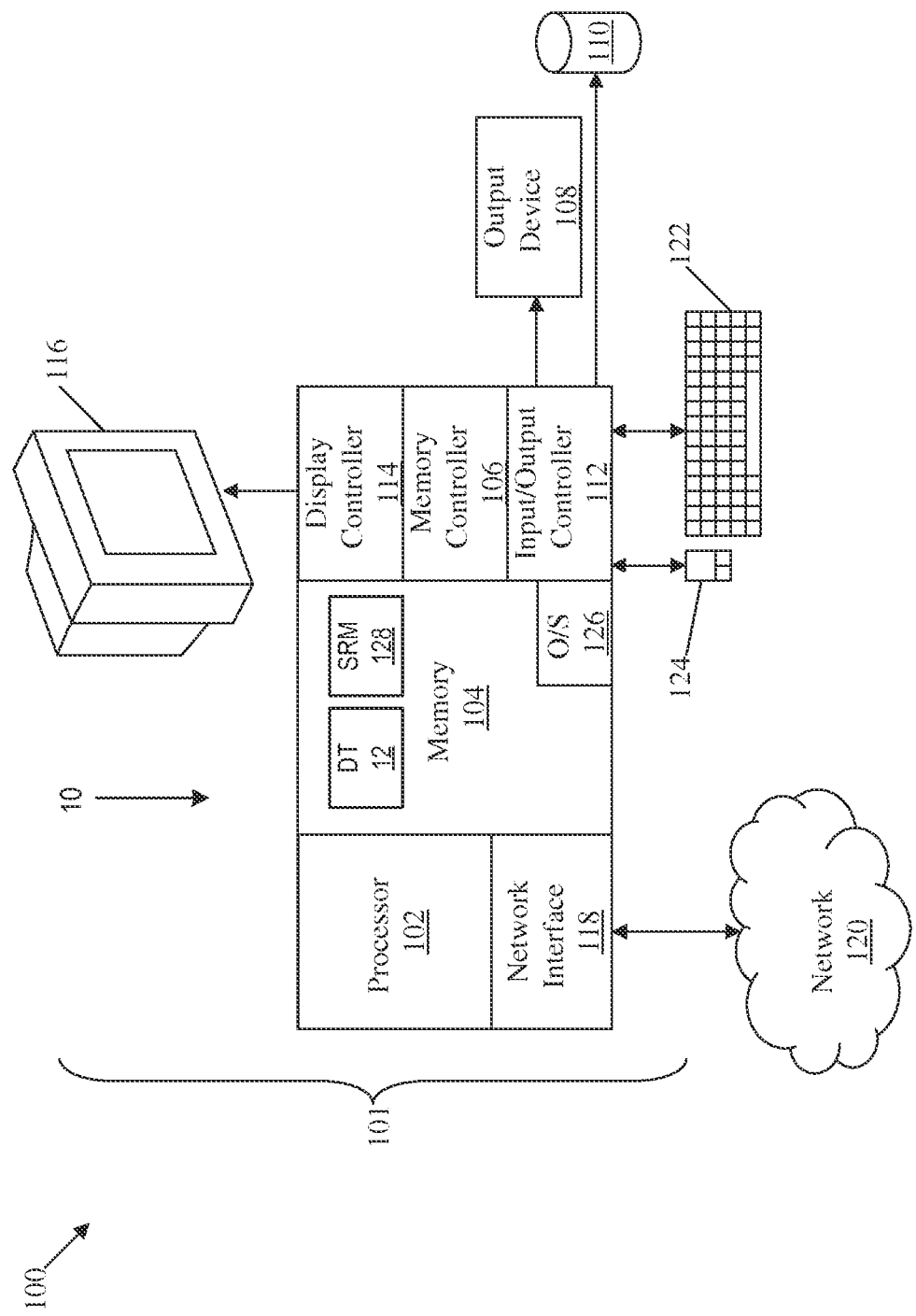
FIG. 1 is a functional block diagram illustrating a computing system including a shape recognition system in accordance with various embodiments.

Referring now to FIG. 1, exemplary embodiments of the present disclosure are directed to a shape recognition system shown generally at 10 that is implemented on a computing device as part of or associated with a diagnostic tool. As can be appreciated, the shape recognition system 10 described herein can be implemented in any computing device for use with various systems or tools that process graphical artifacts and is not limited to any one example. For exemplary purpose, the disclosure will be discussed in the context of the shape recognition system 10 being used for a diagnostic tool 12 that auto-generates diagnostic models.

Turning now to the drawings in greater detail, it will be seen that in FIG. 1 an exemplary computing system 100 includes the shape recognition system 10 in accordance with the present disclosure. The computing system 100 is shown to include a computer 101. As can be appreciated, the computing system 100 can include any computing device, including but not limited to, a desktop computer, a laptop, a server, a portable handheld device, or any other electronic device. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122 and mouse or touchpad and 124 can be coupled to the input/output controller 112. In an exemplary embodiment, the computing system 100 can further include a network interface 118 for coupling to a network 120. The network 120 transmits and receives data between the computer 101 and external systems.

In various embodiments, the memory 104 stores instructions that can be executed by the processor 102. The instructions stored in memory 104 may include one or more separate programs, each of which comprises an ordered listing of executable instructions for implementing logical functions. In the example of FIG. 1, the instructions stored in the memory 104 include a suitable operating system (OS) 126. The operating system 126 essentially controls the execution of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The processor 102 executes the instructions of the shape recognition system 10 of the present disclosure. In various embodiments, the shape recognition system 10 includes a shape recognition module (SRM) 128 that is stored in the memory 104 (as shown), is executed from a portable storage device (e.g., CD-ROM, Diskette, FlashDrive, etc.) (not shown), and/or is run from a remote location, such as from a central server (not shown).

Generally speaking, the shape recognition module 128 receives a graphical artifact and processes the graphical artifact based on a shape recognition method of the present disclosure in order to identify the shape used in the graphical artifact. The shape recognition method allows the shape recognition module 128 to process various types of graphical artifacts without having pre-defined knowledge of the specific graphical artifacts.

Figure 2:
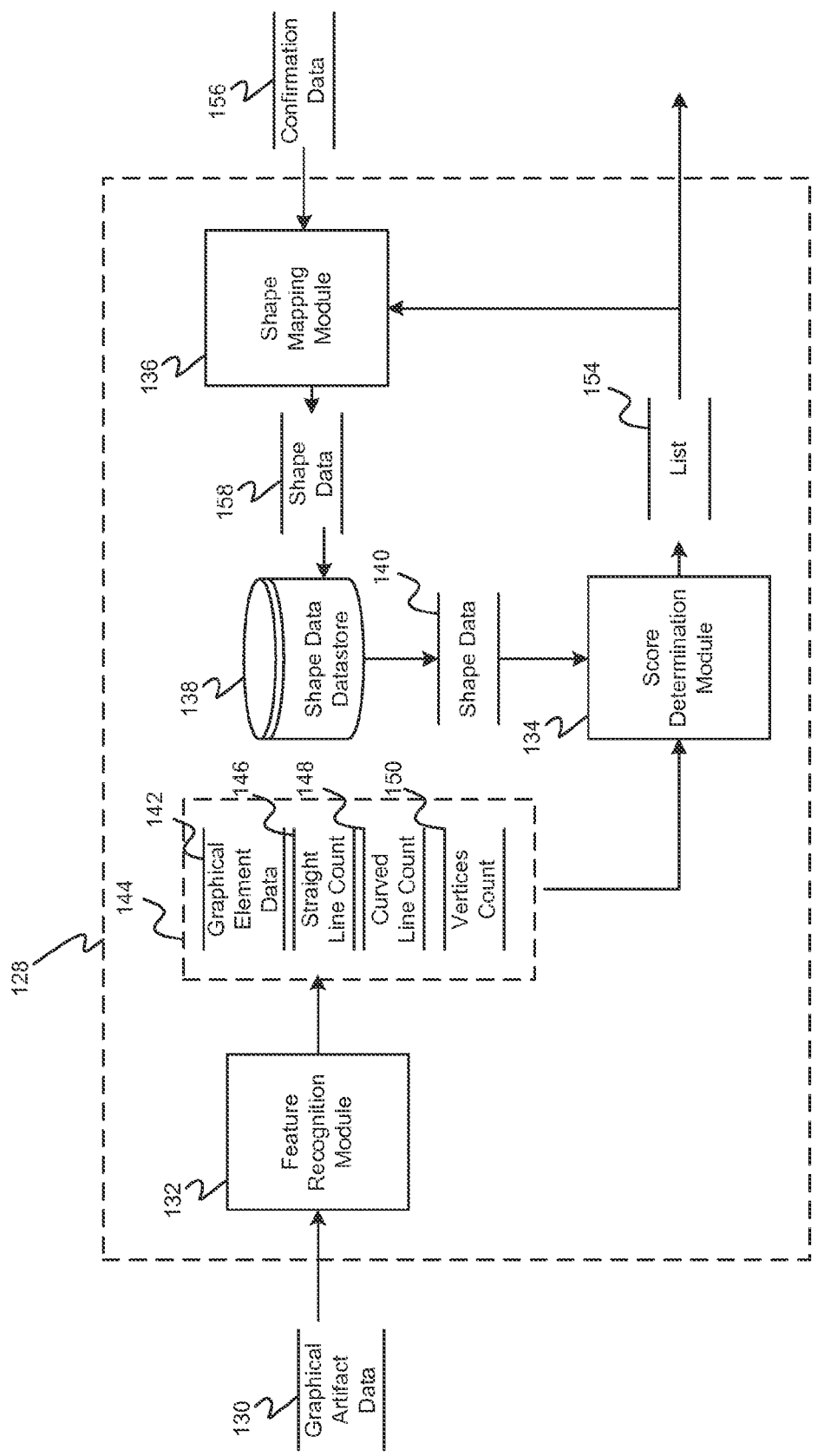
FIG. 2 is a dataflow diagram illustrating a shape recognition module of the shape recognition system in accordance with various embodiments.

With reference now to FIG. 2, the shape recognition module 128 is illustrated in more detail in accordance with various embodiments. Various embodiments of the shape recognition module 128 according to the present disclosure may include any number of sub-modules. As can be appreciated, the sub-modules shown in FIG. 2 may be combined and/or further partitioned to similarly process various graphical artifacts. The inputs to the shape recognition module 128 may be provided based on user input and/or received from other modules associated with or a part of the shape recognition system 10. As can be appreciated, graphical artifact data 130 may be provided to the shape recognition module 128 in a file format such as, but not limited to a .pdf file, a .svg file, a .vsd file, etc.

In various embodiments, the shape recognition module 128 includes a feature recognition module 132, a score determination module 134, a shape mapping module 136, and a shape data datastore 138. The shape data datastore 138 stores shape data 140 defining features (e.g., a number of straight lines, a number of curved lines, a number of vertices, or other features) of various shapes. Initial shape data may be pre-defined by a user or other system and stored in the shape data datastore 138. The shape data in the shape data datastore 138 may be updated based on a learning process provided by the feature recognition module 132, the score determination module 134, and the shape mapping module 136.

For example, the feature recognition module 132 receives as input graphical artifact data 130. The feature recognition module 132 extracts graphical elements 142 from the graphical artifact data 130 and evaluates the graphical elements 142 to determine features of the graphical elements 142. The feature recognition module 132 generates shape data 144 for the graphical element 142 based on the features.

In various embodiments, the features can include, but are not limited to straight line features, curved line features, and vertices. For example, the feature recognition module 132 evaluates a first graphical element (or a first set of similar graphical elements) 142 for straight lines. The feature recognition module 132 generates a count 146 of the number of identified straight lines for the graphical element(s) 142. The shape data 144 includes the count 146.

In another example, the feature recognition module 132 evaluates the first graphical element (or a first set of similar graphical elements) 142 for curved lines. The feature recognition module 132 generates a count 148 of the number of identified curved lines for the graphical element(s) 142. The shape data 144 includes the count 148.

In another example, the feature recognition module 132 evaluates the first graphical element (or a first set of similar graphical elements) 142 for vertices. The feature recognition module 132 generates a count 150 of the number of identified vertices for the graphical element(s) 142. The shape data 144 includes the count 150.

The score determination module 134 receives as input the shape data 144. The score determination module 134 compares the shape data 144 for the graphical element(s) 142 with the shape data 140 of shapes stored in the shape data datastore 138. The score determination module 134 computes a similarity score between the received shape data 144 and each shape of the shape data datastore 138 based on the comparison. In various embodiments, the score determination module 134 computes the similarity score based on a simple hamming distance. For example, when the shape data 144 and 140 includes a count of straight lines, a count of curved lines, and a count of vertices, the similarity score can be computed from the stored data 140 and the new data 144 as:

$$\text{Similarity\_Score} = \text{ABS}(\text{StoredStraight\_Num} - \text{NewStraight\_Num}) + \text{ABS}(\text{StoredCurve\_Num} - \text{NewCurve\_Num}) + \text{ABS}(\text{StoredVertices\_Num} - \text{NewVertices\_Num}).$$

The score determination module 134 generates a list 154 including the similarity scores and the associated shape pairs (i.e., the received shape and the stored shape). In various embodiments, the list 154 is provided in ascending order, where the shape with the score of zero is first and the shapes with larger scores are listed after. In various embodiments, the list 154 is graphically or textually presented to a user for confirmation (e.g., via a visual, audio, or other type of user interface).

The shape mapping module 136 receives as input the list 154 of similarity scores. The shape mapping module 136 associates the shape data 144 with a particular shape and stores the associated shape data based on an evaluation of the similarity score. For example, the shape mapping module 136 determines a shape pair having an associated lowest similarity score and stores a pattern 158 (e.g., including the identified features and score) of the graphical element associated with the shape pair with the stored shape in the shape data datastore 138. In such embodiments where the list 154 is provided to the user for confirmation, user confirmation data 156 is received indicating a selected shape pair and/or similarity score. The shape mapping module 136 stores the pattern 158 of the graphical element associated with the selected shape pair and the similarity score with the stored shape in the shape data datastore 138.

As can be appreciated, the updated shape data datastore 138 can then be used to process any remaining graphical elements of the graphical artifact data 130. As can further be appreciated, the updated shape data datastore 138 can then be used by the diagnostic tool 12 for processing graphical artifacts to auto-generate diagnostic models.

Figure 3:
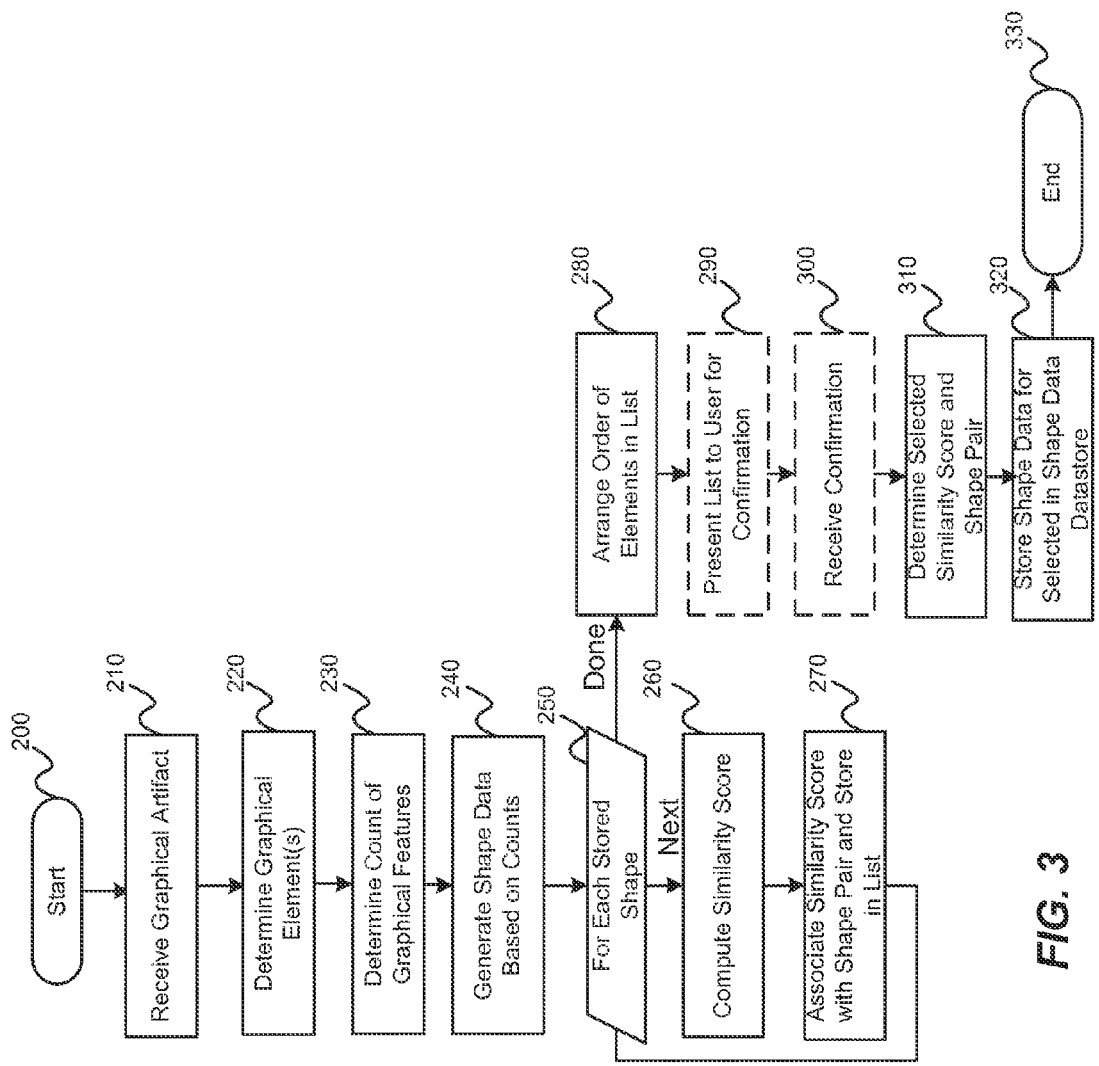
FIG. 3 is a flowchart illustrating a shape recognition method that may be performed by the shape recognition module in accordance with various embodiments.

Referring now to FIG. 3 and with continued reference to FIGS. 1 and 2, a flowchart illustrates a method that can be performed by the shape recognition module of FIGS. 1 and 2 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events or may be scheduled to run at predetermined time intervals. In one example, the method may begin at 200. The graphical artifact data 130 is received at 210. The graphical artifact data 130 is processed for a first graphical element or set of graphical elements 142 at 220. The first graphical element or set of graphical elements 142 is evaluated at 230 to identify and count graphical features. The shape data 144 is generated based on the identified count of features at 240.

For each stored shape in the shape data datastore 138 at 250, the associated stored shape data and the new shape data is used to compute a similarity score at 260. The similarity score is associated with the shape pair and stored in the list 154 at 270. Once all of the similarity scores have been computed at 250 and the list 154 is complete, the order of the elements in the list 154 is arranged (e.g., in ascending order, or some other order) based on the similarity score at 280. Thereafter, the list 154 is optionally presented to the user for confirmation at 290 and confirmation data 156 is optionally received at 300. A selected similarity score and associated shape pair is determined at 310 either based on the received confirmation data 156 or based on the value of the similarity score. The pattern 158 of the graphical element 142 associated with the shape pair is stored with the stored shape in the shape data datastore 138 at 320. Thereafter, the method may end at 330.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first", "second", "third", etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of processing a graphical artifact, comprising:

receiving, by a processor, a graphical artifact having at least one unknown graphical element;

determining, by the processor, a count of each graphical feature of the unknown graphical element, the graphical features comprise a straight line, a curved line, and a vertex feature;

computing, by the processor, a plurality of similarity scores based on the counts of features of the unknown graphical element and counts of features of a plurality of known graphical elements;

storing data associated with the unknown graphical element with data associated with a known graphical element based on the plurality of similarity scores; and performing an action, by the processor, based on the stored data.

2. The method of claim 1, wherein the computing the similarity score is based on a hamming distance.

3. The method of claim 1, further comprising arranging the plurality of similarity scores in ascending order and wherein the storing the data is based on a first similarity score of the ascending order.

4. The method of claim 1, further comprising presenting the plurality of similarity scores to a user; and receiving a confirmation of a selected similarity scored based on the presentation.

5. A system for processing a graphical artifact, comprising:

a feature recognition module that receives, by a processor, a graphical artifact having at least one unknown graphical element and that determines, by a processor, a count of each graphical feature of the unknown graphical element, the graphical features comprising a straight line, a curved line, and a vertex feature;

a score determination module that computes, by a processor, a plurality of similarity scores based on a summation of differences between the counts of the features of the unknown graphical element and counts of features of a plurality of known graphical elements; and a shape mapping module that stores data associated with the unknown graphical element with data associated with a known graphical element based on the plurality of similarity scores, and that, and that performs an action, by the processor, based on the stored data.

6. The system of claim 5, wherein the score determination module computes the similarity score based on a hamming distance.

7. The system of claim 5, wherein the shaping module arranges the plurality of similarity scores in ascending order and stores the data based on a first similarity score of the ascending order.

8. The system of claim 5, wherein the shaping module presents the plurality of similarity scores to a user; and receives a confirmation of a selected similarity scored based on the presentation.

9. One or more non-transitory computer-readable storage media having instructions stored therein for performing a method, the method comprising:

receiving, by a processor, a graphical artifact having at least one unknown graphical element;

determining, by the processor, a count of each graphical feature of the unknown graphical element, the graphical features comprising , the graphical features comprising a straight line, a curved line, and a vertex feature;

computing, by the processor, a plurality of similarity scores based on a summation of differences between the features of the unknown graphical element and features of a plurality of known graphical elements;

storing data associated with the unknown graphical element with data associated with a known graphical element based on the plurality of similarity scores; and performing an action, by the processor, based on the stored data.

10. The storage media of claim 9, wherein the computing the similarity score is based on a hamming distance.

11. The storage media of claim 9, further comprising arranging the plurality of similarity scores in ascending order and wherein the storing the data is based on a first similarity score of the ascending order.

* * * * *